(12) United States Patent
Langlotz

(10) Patent No.: US 11,379,662 B2
(45) Date of Patent: Jul. 5, 2022

(54) DATA ENTRY CAPITALIZATION ERROR CORRECTION SYSTEM AND WORD PROCESSING SYSTEM WITH SECOND LANGUAGE FACILITY

(71) Applicant: Karmen Langlotz, Dallas, TX (US)

(72) Inventor: Karmen Langlotz, Dallas, TX (US)

(*) Notice: Subject to any disclaimer, the term of this patent is extended or adjusted under 35 U.S.C. 154(b) by 0 days.

(21) Appl. No.: 17/071,241

(22) Filed: Oct. 15, 2020

(65) Prior Publication Data

US 2021/0124873 A1 Apr. 29, 2021

Related U.S. Application Data

(60) Provisional application No. 62/927,225, filed on Oct. 29, 2019.

(51) Int. Cl.
*G06F 40/20* (2020.01)
*G06F 40/232* (2020.01)
*G06F 40/166* (2020.01)
*G06F 3/023* (2006.01)
*G06F 3/0482* (2013.01)

(52) U.S. Cl.
CPC ............ *G06F 40/232* (2020.01); *G06F 3/023* (2013.01); *G06F 3/0233* (2013.01); *G06F 3/0482* (2013.01); *G06F 40/166* (2020.01)

(58) Field of Classification Search
None
See application file for complete search history.

(56) References Cited

U.S. PATENT DOCUMENTS

| | | | | |
|---|---|---|---|---|
| 5,761,689 A * | 6/1998 | Rayson | ................. | G06F 40/232 715/210 |
| 6,047,300 A * | 4/2000 | Walfish | ................. | G06F 40/232 715/257 |
| 6,801,190 B1* | 10/2004 | Robinson | ............. | G06F 3/0219 345/173 |
| 7,451,398 B1* | 11/2008 | Rohrs | ................... | G06F 40/232 715/260 |
| 8,726,148 B1* | 5/2014 | Battilana | ............... | G06F 40/274 715/234 |
| 9,588,596 B2* | 3/2017 | Fux | ....................... | G06F 3/0237 |
| 9,606,634 B2* | 3/2017 | Assadollahi | .......... | G06F 40/242 |
| 10,338,810 B2* | 7/2019 | Shin | ..................... | G06F 3/04886 |
| 11,003,839 B1* | 5/2021 | Hatch | ................... | G06F 3/0482 |
| 2002/0099744 A1* | 7/2002 | Coden | ................... | G06F 40/232 715/260 |
| 2004/0108373 A1* | 6/2004 | Mehring | ................. | G06F 3/014 235/145 R |
| 2007/0074131 A1* | 3/2007 | Assadollahi | .......... | G06F 40/242 715/816 |

(Continued)

*Primary Examiner* — Maikhanh Nguyen
(74) *Attorney, Agent, or Firm* — Bennet K. Langlotz; Langlotz Patent & Trademark Works, LLC

(57) ABSTRACT

A word processing system has a keyboard having a plurality of letter keys and a shift key operable to generate capitalized letters, a processor connected to the keyboard and a display connected to the processor. The processor is operable to detect entry of an entered two-letter word, to determine if the entered two-word is in all capital letters, and if the entered two-word is in all capital letters to assess whether the typing was intentional or in error. If it is assessed that the typing was in error, the processor being operable to correct the two-letter word to an initial capital followed by a lower case letter.

9 Claims, 1 Drawing Sheet

(56) References Cited

U.S. PATENT DOCUMENTS

2012/0268382 A1* 10/2012 Raguseo ............... G06F 3/0237
345/168
2013/0212515 A1* 8/2013 Eleftheriou ......... G06F 3/04883
715/773
2017/0123651 A1* 5/2017 Shin ..................... G06F 3/0233

* cited by examiner

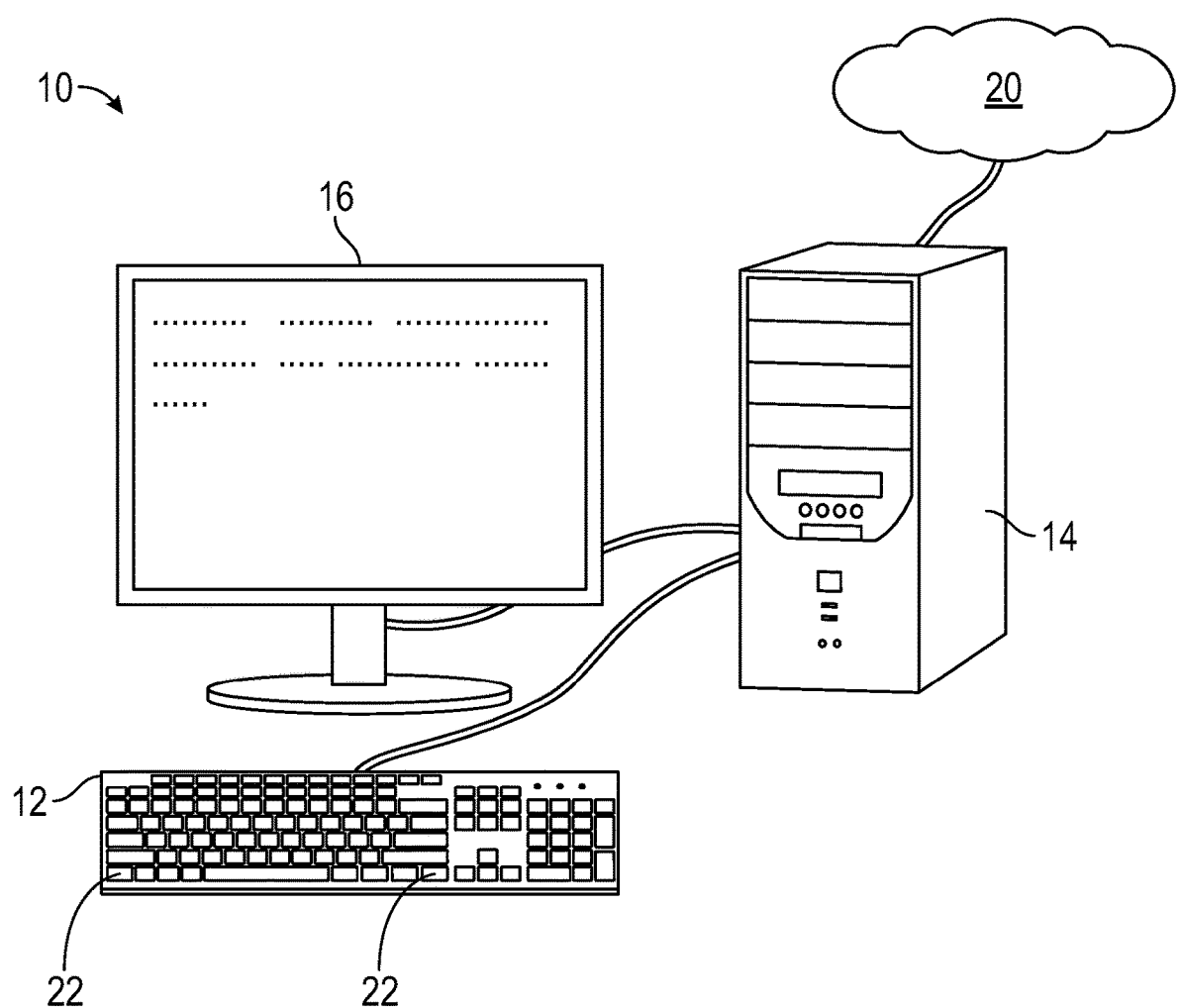

DATA ENTRY CAPITALIZATION ERROR CORRECTION SYSTEM AND WORD PROCESSING SYSTEM WITH SECOND LANGUAGE FACILITY

CROSS-REFERENCE TO RELATED APPLICATIONS

This application claims the benefit of U.S. Provisional Patent Application No. 62/927,225, filed on Oct. 29, 2019, entitled "Data Entry Capitalization Error Correction System and Word Processing System with Second Language Facility", which is hereby incorporated by reference in its entirety for all that is taught and disclosed therein.

FIELD OF THE INVENTION

The present invention relates to computer word processing systems, and to spell checking and error correcting functions, and error correcting functions for multi-lingual users.

BACKGROUND AND SUMMARY

Word processing systems have spell checking features that include detection of typing errors in which the shift key is held down too long, and not released until after two or more characters of a word are entered. The entry of "COmmunication" is corrected to "Communication." While effective with words long enough to have lower case characters entered after multiple capital letters, it does not address all typing errors resulting from a slow release of the shift key by the typist. This is a problem when a word is short, and all the letters of the word are typed in all caps—frequently at the beginning of a sentence. Therefore, existing systems do not correct a short word in all caps. This leaves uncorrected a class of errors that include short initial words that are quickly typed before the shift key is released.

The preferred embodiment addresses these problems by providing a word processing system has a keyboard having a plurality of letter keys and a shift key operable to generate capitalized letters, a processor connected to the keyboard and a display connected to the processor. The processor is operable to detect entry of an entered two-letter word, to determine if the entered two-word is in all capital letters, and if the entered two-word is in all capital letters to assess whether the typing was intentional or in error. If it is assessed that the typing was in error, the processor being operable to correct the two-letter word to an initial capital followed by a lower case letter.

BRIEF DESCRIPTION OF THE DRAWINGS

FIG. 1 shows various views of a preferred embodiment of the invention.

DETAILED DESCRIPTION OF A PREFERRED EMBODIMENT

FIG. 1 shows a computer word processing system 10 including an alphanumeric keyboard 12 connected to a processor 14, which is connected to a display 16. The processor may include software operable to provide the disclosed actions and may be connected to a network 20 of other computers where any of the processing functions and software may be located.

As a user types, the processor operates to receive the typed string of characters, reading and storing it, and transmitting it to the display. The system includes ongoing error correction that immediately corrects typing errors as the user types, based on rules stored with the software and which may be modified, customized, or defeated by the user.

The system is programmed to offer correction of a particular error type: Unintended holding of the shift key 22 with an errantly while typing all the letters of a short word at the beginning of a sentence. Input error examples include:

"NO man is an island."

"THE quick brown fox . . . "

"YOU're going to be interested . . . "

"NO. I meant that we should . . . ".

Conventional correction of slow shift release errors with two initial caps in a word with more than two letters (e.g. THe, MIssissippi) is essentially never mistaken or unwanted because there is no normal usage with multiple initial capital letters, and changing two letters to one is virtually always correct. On the other hand, the types of errors addressed by the system of the preferred embodiment are similar to uses that are intentional. This presents an important principle of error-correction systems: It is much more problematic (or costly, or irritating) to change (mistakenly "correct") an intended usage than to fail to correct an actual typographical error. A system that changes a correct intended input can be said to have made an "errant correction."

The existing system of correcting dual initial caps in a word of three or more letters has virtually no risk of committing the unacceptable sin of changing intended correct typing: the errant correction. For the rare user that finds it does, the feature can be turned off. The disclosed system requires much greater sophistication to distinguish between errors and intended correct usage that have presented demotivating obstacles to expanding existing error correction systems to capture more errors of the type disclosed.

The system may reduce or avoid errant corrections when it detects entry of a short word in all caps first by looking at the position of the word in question in the document, especially its position in the sentence and with respect to punctuation. This threshold of word "shortness" may be set by the user but normally may default to two letter words which will serve as the example for discussion even as three or more letters may be desirable for some users or distinguishable situations. Because of the necessity to use the shift key at the first word of every sentence, this is a frequent opportunity for error in prolonged shift key depression. It is believed that users may get more casual or sloppy with their keystrokes for instances that arise frequently (e.g. starting a new sentence) compared to special cases like inserting a two-letter word needing an initial capital in the middle of a sentence. In the rest of the sentence the shift key is not normally used, except for special cases like proper names, acronyms, and abbreviations. Two letter words occur frequently, including as the first word of a sentence. Thus, two letter words with an initial cap are common at the beginning of sentences (including the one that follows). On the other hand, two-letter words with initial caps are rare after the first word in a sentence. The applicant struggles to come up with examples other than several first names (e.g. Al, Bo, Cy, Di, Ed . . . ), and geographic place names. These are rarities in typical text entry, compared to the frequency of two letter words at the beginning of a sentence.

If there were users who found it frustrating every time they accidentally entered "ED" instead of "Ed" while writing an article about Ed Sullivan, these would be unserved customers by a system that did not provide correction except at the initial word of a sentence, or other circumstances in a sentence where it is required such as at the beginning of a quote, or sometimes after a colon. These circumstances are believed to be exceedingly rare, and any benefits of correcting these errors are outweighed by a system that risked committing an errant correction potentially on any all-caps two-letter word in a sentence.

Mid-sentence two-letter all-caps entries are not rare. Company names such as GM and HP may be frequent entries. When considering three letter words, television networks (CBS, CNN) and universities (MIT, USC) are examples among multitudes of use terms where mid-sentence error correction is too risky to be justified. Two-letter state codes might be frequently used in informal text entry, and some of these are even dictionary words (HI, IN, OR, PA). The commonality of two-letter all-caps in mid-sentence is too common to risk assuming that every two-letter entry is an error and generating errant corrections. Limiting correction only to the beginnings of words (and beginnings of phrases after certain punctuation where non-proper words are capitalized) helps to minimize errant corrections that are believed to have deterred existing system developers from correction more prolonged shift errors beyond two initial caps in words more than two letters long.

The system may reduce or avoid errant corrections when it detects entry of a short word in all caps second by looking at the nature of the word in question. For this purpose, words may be categorized.

Category 1A: Common non-proper dictionary words. These are words that would be in the system's word list or dictionary, normally used for spell checking, and which are not normally capitalized, and which are capitalized only at the beginning of a sentence and other special circumstances. Among two-letter words these include many common words: ad, am, an, as, at, by, do, go, if, in, is, it, me, my, no, of, oh, on, or, pa, so, to, us, we. These are the best candidates for assuming that any all-caps entry is an error, especially at the initial word of a sentence.

Category 1B: Less common non-proper dictionary words. As above, but less frequently used (e.g. ad, bi, da, ef). Systems may choose to treat uncommon words as non-dictionary-words because it is relatively more likely that a user entering a word known only to word game players in all caps (e.g. EN, PO, UT) is intending the all-caps use (e.g. English, post office, University of Texas) than the obscure meaning. This further reinforces the benefits of avoiding mid-sentence corrections, because as unlikely it is that a user begins a sentence "UT . . . " intending "Ut . . . " it is far rarer that he uses the shift key mid-sentence and inadvertently typing "UT" intending "Ut" or "ut" and not referring to the state postal code for Utah or a university in a state beginning with T.

Besides differentiating non-proper dictionary words into common and uncommon, they may be categorized into more categories or degrees based on frequency, and the user setting how sensitive the correction settings are to include more or fewer of these subcategories (or the system detecting user overrides to correction or correction of uncorrected entries to gauge and adjust the sensitivity automatically based on the apparent types of correction errors being made. Alternatively, each entry may be assigned a numeric value of frequency, and the determination whether or not to make a correction based on a function of the frequency, a user-set sensitivity setting, and other factors including position in the sentence and the number of letters in the word—three-letter words presenting greater risk of intentional all-caps not needing correction, so only the most common ones being corrected: "THE, YOU, TWO" being examples that when they appear in all caps at the beginning of a sentence are probably typing errors needing correction, especially by users with typing habits prone to this type of error that might use a higher sensitivity setting. (To assess this, the system logs data about the user's and system's errors and corrections to determine an optimized protocol).

Another differentiation is in the commonality of words used as initial words in a sentence. In the list in Category 1, "we" is commonly used at the start of a sentence, but "us" is not. Without analyzing the context, is a sentence beginning "US . . . " confidently intended as "Us . . . " (e.g. "Us cowboys have got to stick together" or "US" (e.g. "US oil production increased . . . ")? When a word is not normally used initially, it may be excluded or down rated in determining whether it is above the threshold to be corrected if entered in all caps.

Category 2: Abbreviations and acronyms. These are typed as two-letter words in all caps. Any on this list (at least of common terms, or in a custom dictionary populated or enhanced by the user) should be excluded from error correction and left as all caps. Common examples include companies (GM, HP) organizations (AA, UN) place names (US, TX), and ordinary terminology (CD, PR). Any two-letter words in this category may be specially excluded. Words in both common word categories (US, OR) and an excludable category such as common abbreviations may optionally be excluded, or down-rated based on user-set sensitivity and other factors as discussed.

Category 3: Proper names. This includes two letter first names and place names. These are rare, and more readily excluded or down rated, with little concern for user frustration. Any that frustrate a user may be added to a custom dictionary of words always to correct if entered in all caps (either as the initial words, or anywhere, or based on other factors).

Category 4: Special challenges. The system creator or publishers may determine some special cases that present unexpected problems, or an exception to the rule. "OK" is a non-proper dictionary word but is commonly typed in all caps so would be listed in a "never correct" category, even as the initial word of a sentence. Because of the much higher priority of not correcting intended entries, words on a "questionable" list may be excluded from correction or downgraded in a rating system.

"Shouting" is a term applied to words typed in all caps. Some users may wish to occasionally use this for emphasis and may set correction sensitivities to leave some all-cap entries that might otherwise be corrected. This is rarely a concern unless one tends to shout only the first short word of a sentence. Nonetheless, a user may set certain words they might shout as "never correct" or with a high threshold of other indicators (e.g. HEY, NO). The system may also prompt a user: "It looks like you're angry, do you want to use more all-caps than usual?" The use of punctuation such as exclamation marks may also be used as an indicator to adjust the sensitivity to correction, tolerating more uncorrected all caps, or reversing an earlier correction when a word or sentence is so concluded. When more than one consecutive word is typed in all caps, a correction is avoided, even if at the outset of a sentence.

The correction may be done immediately when typing as with many auto-correct functions or may also be done to process completed documents for error correction. It may also be done immediately, but may undo some corrections as subsequent typing indicated an intent not needing correction (such as consecutive all caps words).

The system may sense whether the all-caps word in question was all caps because of the use of the shift key, or whether it was due to the all-caps key. In the former the all caps entry is more likely to be a candidate for correction, and those caused by use of the all-caps key would preferably be ignored.

Other punctuation may be considered. While someone might type "HI, PA!" it's most likely that they are not putting state abbreviations in quotes because the comma and exclamation points indicate speech, so that correction might be avoided, or its likelihood reduced. Any exclamation point with all caps is an indicator that the all caps are intended and not needing correction.

Expert systems may further determine numerous factors to assess the likelihood of the need for correction, including determining the meaning of the word based on context, comparing with reference databases on other documents to determine how frequently the all-caps word appears next to the same word or phrase, as opposed to how often that word appears without all-caps.

The system may have dictionary entries indexed by parts of speech, and then based on the two-letter word in all caps being assessed for correction, look to the next word for part of speech. For example, IN as a state abbreviation might be intended as a noun or adjective (e.g. "IN is rainy." "IN apples are ripe now"). On the other hand, a sentence might have different arrangements and structure with the initial two-letter word has a different meaning ("IN spring the flower bloom.")

In the preferred embodiment, the system defaults to analyze two letter words, but may optionally be set to longer words, at least three letter words being useful to some users. Users may select a stricter limit on corrections for three-letter words, and may well have just a few such words.

Because of the limited number of two letter words, the system will default to a list of most common two letter words that aren't likely to be used intentionally in all caps. This may be a list of less than 100 words, and even a much shorter list may cover the vast majority of the types of unintended all caps errors that need correction.

Option: Look at next word. If also all caps then don't correct initial two letter all caps word.

Option: The system may measure typing rate, including a typical rate, and the rate for the two letters of the two-letter word that has been entered in all caps. A determination to correct to initial caps may be made based on when the two letters are typed faster than a certain interval, and this interval may be based on the user's typical typing rate. Or, the duration of the shift key depression may be noted by the system, and when the total depression time of the shift key is less than a certain amount, the correction of an all caps entry may be provided. Conversely, if the two letters are typed more slowly than a certain threshold, or when the shift key is depressed for longer than a certain threshold, the system may assume the all caps entry was deliberate and intended, and not make a correction when a correction might otherwise be made.

Flow Chart:
Is the word at the beginning of the sentence?
If no, leave as is. If yes, is it a two-letter word?
If no, leave as is. If yes, is it typed in all caps?
If no, leave as is. If yes, is it on the list of words to be corrected?
If no, leave as is. If yes, change the second latter to lower case.

Foreign Language Detection Embodiment

The system has a setting for preferred language and employs a selected dictionary and rules to evaluate and alert to or automatically correct errors in entered text in the context of the selected language. This is normally selected by the user, and single language users set the language once and don't need to change the setting. But when a user has the system set to expect language #1, and instead starts typing in a second language #2, the system invariably generates unwanted "corrections."

Instead, in the preferred system, at the start of typing a new document the system may note an unexpected and uncharacteristic high concentration of errors beginning early in the text entry. It may then reassess the text in the context of the user's selected second language (as well as additional languages—as many as the user might select). If errors are significantly reduced, the system may simply switch automatically, or prompt the user to offer to switch languages ("it looks like you're typing in English again, do you want to change the language?")

Search engines and online translators may parse text to determine what language it is, and then use this for searching or translation. Some of these capabilities to determine language by any means may be included in the system.

The user may opt to have the system analyze for language at the start of every document, or work session. Or they may have the system analyze only in response to detection of an unexpected pattern with a storm of errors at the outset of the document. One option may be "don't make spellcheck changes and alerts in the first several words of the first sentence until checking the language." Users may have an selectable or adjustable sensitivity to changing languages or proposing a change, and this may be based on the percentage of words with errors, or on the amount by which the error rate at the start is greater than a norm established by the user's past patters, or on the difference in error rate between using one language and another language. In that last example, small differences might not be used to change settings or even to prompt, and more typing might be allowed until enough data is present to make one language the clearly intended choice.

The system may also be used with a dual language mode to enable a user to select two or more languages to be employed in the same document. This may be useful in an English-language article about a foreign language topic, or for casual personal correspondence between family members. In such a mode the system may continually analyze to switch back and forth between or among the languages. It may also be programmed to tolerate all spellings from two different dictionaries, instead of treating a correct Spanish word as an error when in English mode. In such a mode it may be less prone to offer substitutes, and some grammar checking errors may be tolerated. The system may also be set to prompt the user to switch languages, or to switch to a tolerant dual language mode.

The system may also be set up to continue to analyze the user's text entry to determine if the user has stabilized into a single language from a different language or from the dual mode, and then switch to a stricter and more exacting error correction for the present text entry pattern. By continually monitoring the text stream it shifts among languages and modes to achieve the best error correction based on the best assumptions of the user's intended language for each sentence, phrase, or word.

Flow Chart:
Determine an error rate in the first n words?
Is this at least____x more than is typical for this user's history, or compared to a set error rate?
If no, leave as is. If yes, take pre-selected action (changing language mode or prompting to do so).

Is the error rate lower by at least _____ x in the user's selected second language?

If no, leave as is. If yes, take pre-selected action.

The invention may be a word processing system comprising a keyboard, a processor connected to the keyboard, a display connected to the processor. The processor operable to note at least two preferred languages from a list of languages, storing a selected language from the preferred languages, provide a dictionary reference for each of the preferred languages, monitor text entered via the keyboard to determine an error rate in the selected language, based on the error rate determining an intended language associated with the entered text.

The invention may be the system wherein determining an intended language includes employing each of the dictionary references for the preferred language to determine which preferred language has a lower error rate.

The invention may be the system including noting a selected language from the preferred languages and changing to a different selected language in response to the error rate.

The invention may be the system wherein changing to a different selected language in response to the error rate includes changing in response to a determination that the error rate of the selected language is greater than the error rate of a different preferred language.

The invention may be the system wherein changing to a different selected language in response to the error rate includes prompting the user to change the language.

The invention may be the system wherein determining an intended language includes prompting the user to change the selected language in response to detecting an error rate greater than a preselected threshold.

The invention may be the system wherein determining an intended language includes automatically changing the selected language.

The invention may be the system including determining an error rate for the entered text in the preferred language other than the selected language.

The invention may be the system wherein determining an intended language is done repeatedly for different words.

The invention may be the system wherein the system is operable in a dual-language mode with each word checked for correctness in the dictionaries of each of the preferred languages, and accepted as correct if correct with respect to at least one of the dictionaries.

The invention may be a word processing system comprising a keyboard, a processor connected to the keyboard, a display connected to the processor. The processor operable to note at least two preferred languages from a list of languages, provide a dictionary reference for each of the preferred languages, monitor text entered via the keyboard to determine if each word is correct in at least one of the dictionaries, refraining from changing the text unless it is incorrect in both dictionaries.

I claim:

1. A word processing system comprising:
   a keyboard having a plurality of letter keys and a shift key executed to generate capitalized letters;
   a processor connected to the keyboard;
   a display connected to the processor; the processor being executed to detect entry of an entered two-letter word;
   the processor being executed to determine if the entered two-letter word is in all capital letters;
   the processor being executed if the entered two-letter word is in all capital letters to assess whether the entering was intentional or in error;
   if is assessed that the entering was in error, the processor being executed to correct the entered two-letter word to an initial capital letter followed by a lower case letter,
   wherein detecting entry of a two-letter word includes determining if the entered two-letter word is at the beginning of a sentence, and limiting correction only to if the entered two-letter word is at the beginning of the sentence,
   wherein assessing whether the entering was intentional or in error includes providing a list of two-letter words eligible for correction, and determining whether or not the entered two-letter word is on the list of two-letter words,
   wherein if the entered two-letter word is at the beginning of the sentence, in all-caps, and on the list of limited-length words, changing the entered two-letter word to an initial capital letter followed by a lower case letter, and
   wherein the processor is executed to determine whether the entered two-letter word was generated by application of the shift key or by a different all-caps key, and basing the determination of whether the entering was intentional or in error on whether the entered two-letter word was generated by the application of the shift key or the all-caps key.

2. The word processing system according to claim 1 including determining whether to correct only based on the position of the entered two-letter word in the sentence.

3. The word processing system according to claim 1 including enabling a user to customize the list of limited-length words by adding and removing words.

4. The word processing system according to claim 1 wherein assessing whether the entering was intentional or in error includes providing a list of two-letter words ineligible for correction and determining whether or not the two-letter word is on the list of two-letter words ineligible for correction.

5. A method of typing error correction for a word processing system with a keyboard having a plurality of letter keys and a shift key executed to generate capitalized letters, a processor connected to the keyboard, and a display connected to the processor, the method comprising the steps of:
   detecting, by the processor, entry of an entered two-letter word;
   determining, by the processor, if the entered two-letter word is in all capital letters;
   if in all capital letters, assessing, by the processor, whether the entering was intentional or in error;
   if in error, correcting, by the processor, the entered two-letter word to an initial capital letter followed by a lower case letter,
   wherein detecting entry of a two-letter word includes determining if the entered two-letter word is at the beginning of a sentence, and limiting correction only to if the entered two-letter word is at the beginning of the sentence,
   wherein assessing whether the entering was intentional or in error includes providing a list of two-letter words eligible for correction, and determining whether or not the entered two-letter word is on the list of two-letter words,
   wherein if the entered two-letter word is at the beginning of the sentence, in all-caps, and on the list of limited-length words, changing the entered two-letter word to an initial capital letter followed by a lower case letter, and wherein the processor is executed to determine whether the entered two-letter word was generated by application of the shift key or by a different all-caps key, and basing the determination of whether the entering was intentional or in error on whether the entered two-letter word was generated by application of the shift key or the all-caps key.

6. The method of claim 5 including determining whether to correct only based on the position of the entered two-letter word in the sentence.

7. The method of claim 5 including enabling a user to customize the list of limited-length words by adding and removing words.

8. The method of claim 5 wherein assessing whether the entering was intentional or in error includes providing a list of two-letter words ineligible for correction and determining whether or not the two-letter word is on the list of two-letter words ineligible for correction.

9. A method of typing error correction for a word processing system with a keyboard having a plurality of letter keys and a shift key executed to generate capitalized letters, a processor connected to the keyboard; and a display connected to the processor, the method comprising the steps:

providing, by the processor, a list of limited-length words considered unlikely to be intentionally typed in all caps at the beginning of a sentence, detecting, by the processor, keyboard entry of a limited length word, determining, by the processor, whether the limited length word was entered at the beginning of the sentence, determining, by the processor, whether the limited length word is typed in all caps, determining whether the limited length word is on the list of limited-length words, and if the limited length word is at the beginning of the sentence, in all-caps, and on the list of limited-length words, changing, by the processor, the limited length word to an initial capital letter followed by all lower case, wherein the limited length word is two letters long; and wherein the processor is executed to determine whether the limited length word was generated by application of the shift key or by a different all-caps key, and basing the determination of whether the entering was intentional or in error on whether the limited length word was generated by the application of the shift key or the all-caps key.

\* \* \* \* \*